United States Patent [19]

Guissard

[11] 4,049,167
[45] Sept. 20, 1977

[54] CUTTING OF GLASS

[75] Inventor: Jean Guissard, Courbevoie, France

[73] Assignee: Saint-Gobain Industries, Neuilly-sur-Seine, France

[21] Appl. No.: 570,554

[22] Filed: Apr. 22, 1975

[30] Foreign Application Priority Data

Apr. 25, 1974 France .............................. 74.14357
Mar. 19, 1975 France .............................. 75.08513

[51] Int. Cl.² ........................................... C03B 33/02
[52] U.S. Cl. ........................................ 225/2; 225/3; 225/96.5; 225/103
[58] Field of Search .............. 225/2, 3, 94, 96, 96.5, 225/103, 104, 98

[56] References Cited

U.S. PATENT DOCUMENTS

| | | | |
|---|---|---|---|
| 3,116,862 | 1/1964 | De Gorter | 225/2 |
| 3,169,683 | 2/1965 | Pierce | 225/2 |
| 3,275,207 | 9/1966 | Preudhomme | 225/2 |
| 3,532,260 | 10/1970 | Augustin et al. | 225/2 |
| 3,567,086 | 3/1971 | Wark et al. | 225/96.5 X |
| 3,592,370 | 7/1971 | Boardman | 225/96.5 X |
| 3,779,437 | 12/1973 | Yamamoto et al. | 225/96.5 |
| 3,795,502 | 3/1974 | De Torre | 225/2 X |

*Primary Examiner*—Frank T. Yost
*Attorney, Agent, or Firm*—Karl W. Flocks

[57] ABSTRACT

A process for automatically removing edge portions from a glass sheet comprises scoring a line of cut on a first surface of the sheet between the edge portion and the remainder of the sheet, hammering the second surface of the sheet along a path opposite the score line to initiate breakage and applying a bending force transverse to this line to the sheet at a predetermined distance from one of its ends to initiate breakage. The process is applicable to long ribbons of glass or to glass volumes having a given length and edge portions of inferior quality may be removed simultaneously from both sides of the sheet.

8 Claims, 11 Drawing Figures

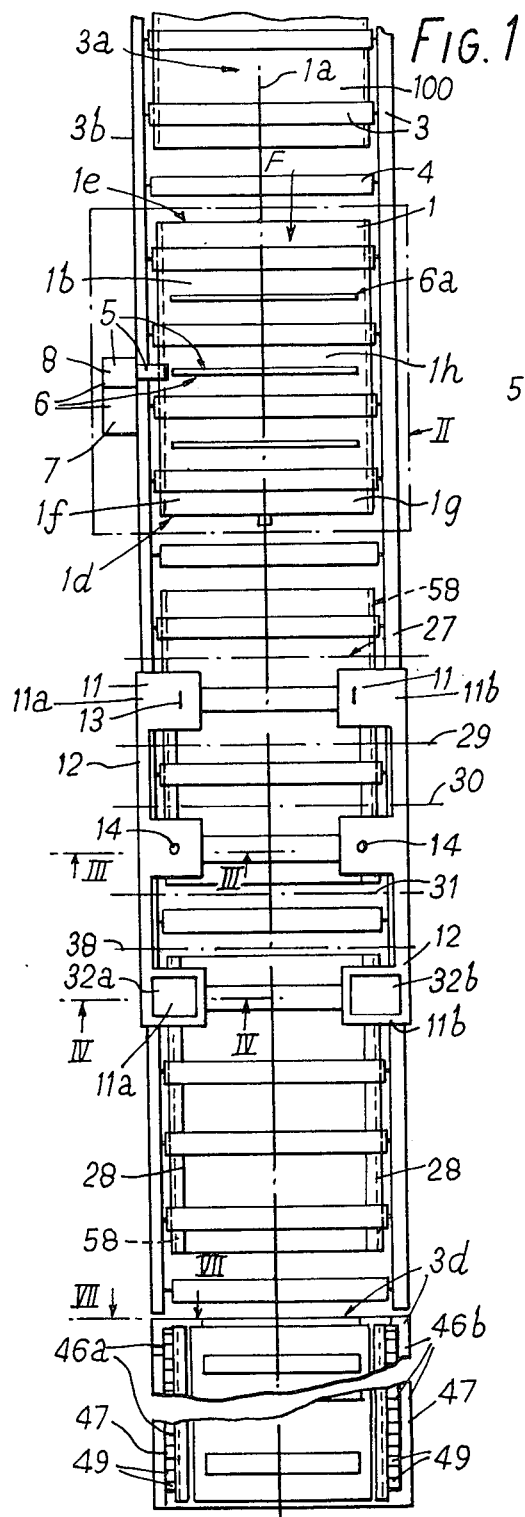
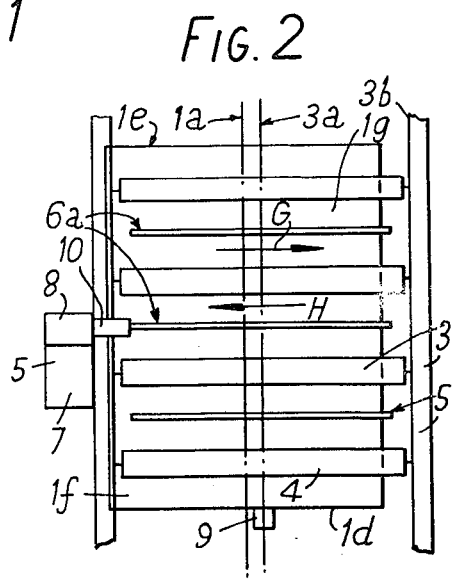
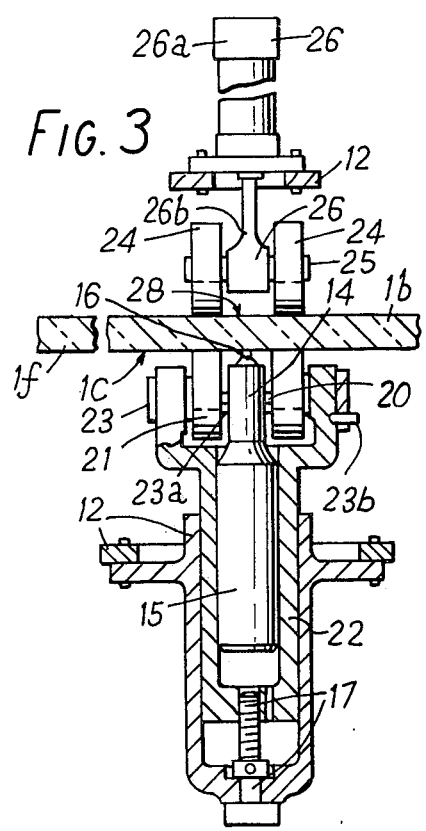

CUTTING OF GLASS

BACKGROUND OF THE INVENTION

The desired outlines of sheets of glass, planar or curved, manufactured in the flat glass industry are normally obtained by successive cuts from a ribbon manufactured by various processes and notably by the float glass process. Advantage of this cutting is taken to eliminate local faults and parts of inferior quality; in particular a glass ribbon frequently has curved and unequal edges and lateral parts of inferior quality which may be eliminated at an earlier stage by these cutting operations.

DISCUSSION OF PRIOR ART

It is known for cutting of narrow edges at the sides of glass sheets or ribbons to make a score line by means of a scoring tool defining a line of rupture and then to achieve separation by means of rollers causing breakage of the glass at a point on the line upstream of the rollers at a substantially constant distance from the latter. The results obtained are satisfactory if the glass has a thickness less than 6 or 8 mm; for greater thicknesses the resulting edges of the glass are frequently biassed and not perpendicular to the surfaces of the glass; it is then necessary to re-cut which entails additional expense.

It is also known to operate the separation by hammering one of the surfaces opposite to the score line. However when the sheet has a large thickness it is necessary to operate with a large energy so that the glass surface is frequently marked and on the other hand there is obtained a correct breakage leading to rectilinear edges which are perpendicular to the surfaces of the ribbon only if certain conditions of reheating, glass thickness and weight of the residual part of the sheet are met.

GENERAL DESCRIPTION OF INVENTION

According to one aspect of the invention, there is provided a process for automatically removing edge portions from a glass sheet, which comprises scoring a line of cut on a first surface of the sheet between the edge portion and the remainder of the sheet, hammering the second surface of the sheet along a path opposite the score line to initiate breakage and applying a bending force transverse to this line to the sheet at a predetermined distance from one of its ends to complete breakage.

The process is applicable to automatic removal of lateral portions of glass sheet, especially a sheet having a thickness equal to or greater than 6 mm by scoring longitudinal lines on a first surface of the glass thus defining two lateral edge portions and a central part and hammering the sheet on the second surface at at least one predetermined location, and in which the hammering is effected progressively along the score line, there being exercised directly after this hammering a bending through a predetermined angle parallel to the longitudinal axis of the sheet in such a manner as to detach the edge portions and the edge portions being eliminated while conserving the central part.

The sheet may or may not have a predetermined length; it may be formed by a "volume" to be sectioned or by a glass ribbon from which it is desired to remove the lateral edge portions having an irregular outline and medicore quality; otherwise the edges would become dangerous for operators, such glass ribbons frequently having a length of several hundred meters.

DESCRIPTION OF PREFERRED EMBODIMENTS

Figure 4:
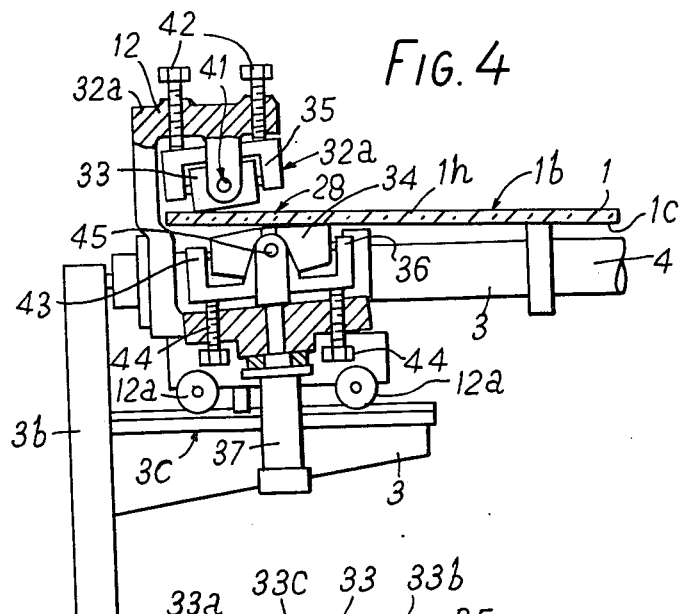
Figure 5:
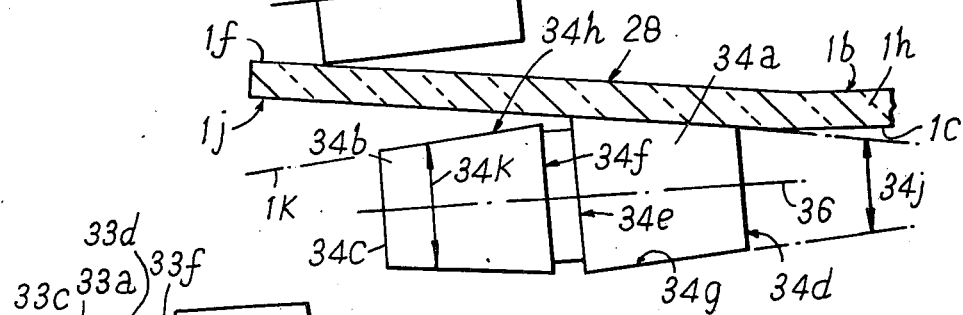
Figure 6:
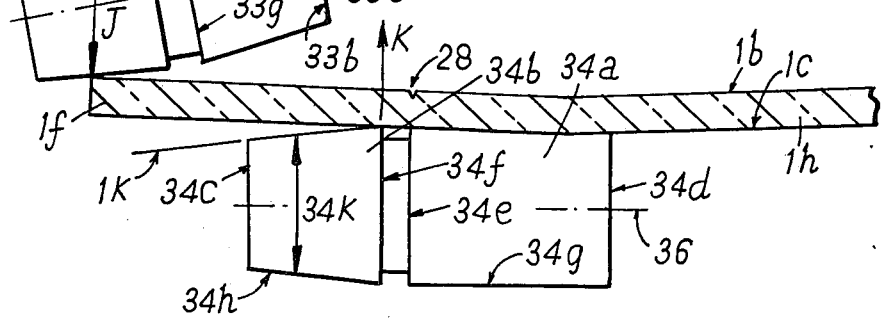
Figure 7:
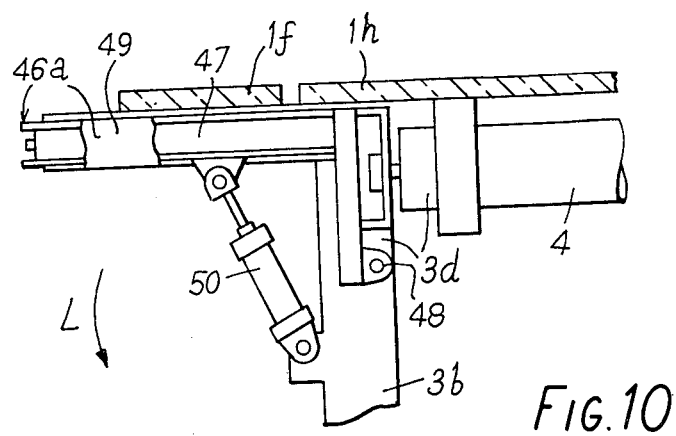
Figure 10:
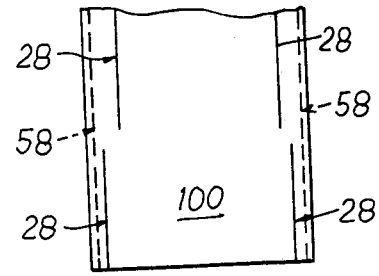
Figure 9:
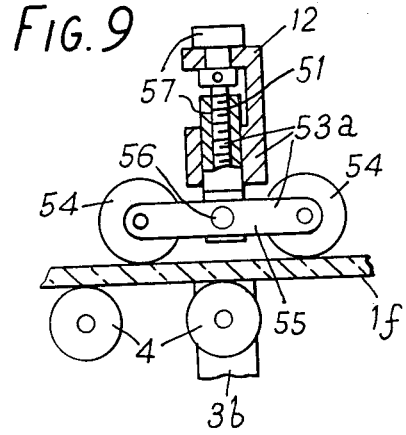
Figure 11:
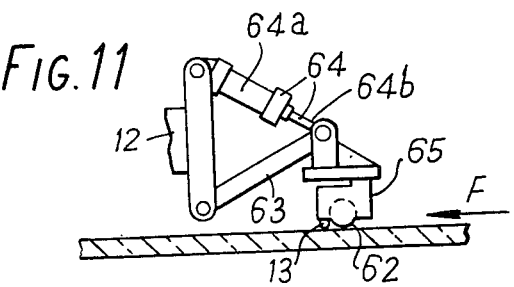
Figure 8:
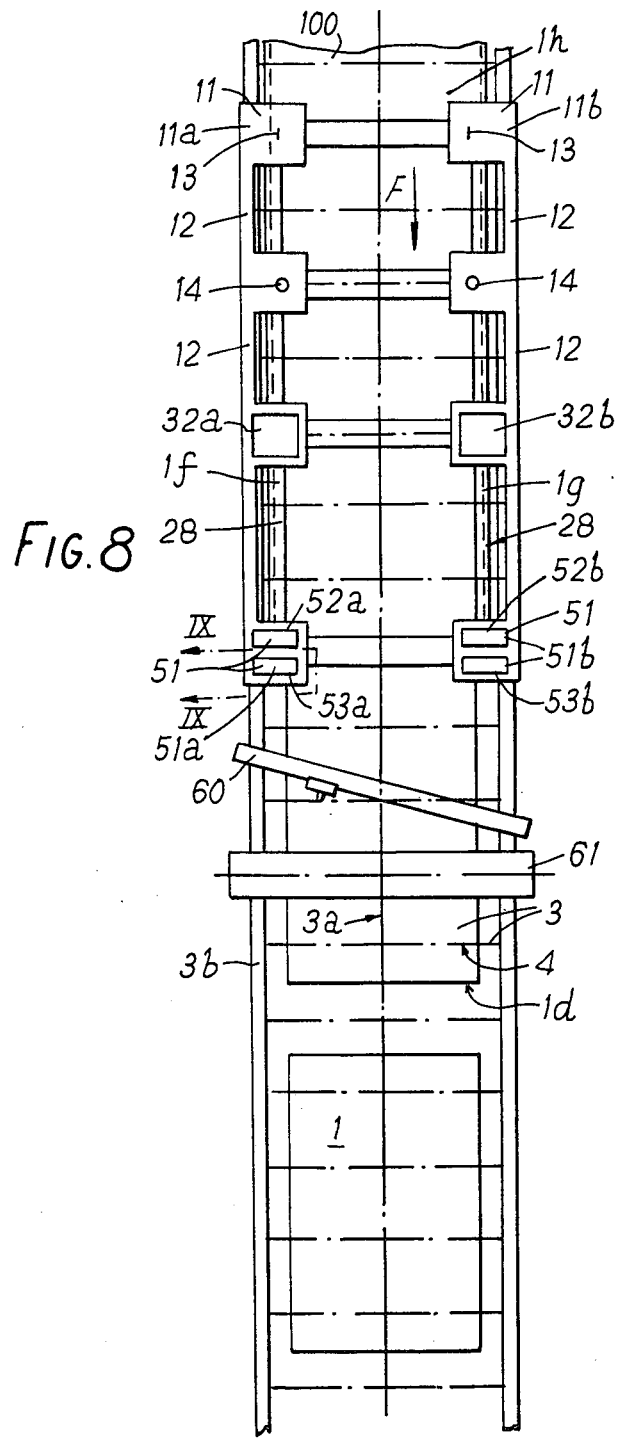

Preferred embodiments of the invention will be described by way of Example with reference to the accompanying drawings in which:

FIG. 1 is a plan view of apparatus according to the invention,

FIG. 2 shows on an enlarged scale the part 2 surrounded by dotted lines in FIG. 1, FIG. 3 is a section on an enlarged scale along the line III—III of FIG. 1, FIG. 4 is a section along line IV—IV of FIG. 1, FIG. 5 shows on an enlarged scale the operation of members shown in FIG. 4, FIG. 6 is analogous to FIG. 5 but relates to an alternative construction of members of FIG. 4, FIG. 7 is a section on an enlarged scale along line VII—VII of FIG. 1, FIG. 8 is a plan view analogous to FIG. 7 of apparatus according to another embodiment, FIG. 9 is a section on an enlarged scale along line IX—IX of FIG. 8, FIG. 10 is a plan view of a glass ribbon treated by the apparatus of FIG. 8, and FIG. 11 shows in elevation a tracing tool.

Referring to FIGS. 1 to 7 of the drawing, a sheet of glass 1 is substantially rectangular and commonly described as a "volume" having a longitudinal axis $1a$, a first surface $1b$, a second surface $1c$, a forward end $1d$, a rear end $1e$, two lateral edges $1f$, $1g$ and a central part $1h$. The volume 1 detached from the ribbon of glass 100 of predetermined width is transported in a direction indicated by arrow F by a conveyor 3 having a longitudinal axis $3a$ and side wall $3b$ comprising rollers 4. This conveys the volume with the rollers in contact with one of the glass surfaces for example $1c$.

The volume, of which the forward and rear ends are perpendicular to the axis $3a$ of the conveyor, first pass through an aligning station 5 where the axis $1a$ of the volume is brought into alignment with the axis $3a$ of the conveyor.

For this purpose there is provided perpendicularly to the conveyor 3 a second conveyor 6 advantageously comprising lifting members $6a$ between the rollers 4 and capable of being lifted above the plane $1c$ by means of a lifting device, (not shown in the drawings) then transported in one direction or the other (arrows G and H) by means of a motor or motoreductor means 7. The lifting device and the means 7 are activated by a governor 8 which is connected to electrical contacts or detectors 9 and 10 respectively situated at an end and on the edge of the station 5. The contact 10, advantageously positioned midway between the ends of the station, has a neutral position where the contact is inactive. This neutral position is initially adjusted to a distance from the axis $3a$ equal to half the width of the ribbon of glass and of the volume.

When the volume 1 passes through the aligning station there comes a moment where one of its ends, for example a forward end $1d$ as shown in the drawing, touches the contact 9, one of the lateral edges for example $1f$ of the volume thus cooperating with the contact 10.

When the axis $1a$ of the volume coincides with the axis $3a$ of the conveyor the contact 10 then in neutral position is inactive and the volume continues to travel in the direction of arrow F. If on the other hand the axis $1a$ does not coincide with the axis 3a the governor 8 acting in cooperation with the contacts 9 and 10 starts the lifting device and motor means 7. The member 6a lifts the volume above the conveyor 3, this volume then being driven in movement by means of motor means 7 and the member 6a in the direction of arrow G or H until the axis 1a of the volume comes into coincidence with the axis 3a of the conveyor. The contact 10 then in neutral position becomes inactive and the governor 8 stops the means 7 and lowers the member 6a below the plane 1c, the volume then resting again on the conveyor 3.

Travelling in the direction of arrow F this volume enters a station 11 formed by two assemblies 11a, 11b which are identical and arranged facing the lateral edges 1f, 1g of the volume. Each of these assemblies of which only 11a will be described comprises a support 12 mounted for sliding on the side wall 3b in the direction of the arrows H and G by appropriate means for example rollers 12a and rails 3c connected to the wall 3b.

At the support 12 is fixed a tracing tool 13, which may be a cutting wheel or diamond and a hammer 14 formed by casing 15 and a mobile mass 16. This hammer, advantageously pneumatically driven, may be adjusted in position with reference to plane 1c and the second surface (having the same reference) of the sheet, by means of appropriate members 17 and 20 in such a manner that the mass 16 is capable of passing the plane 1c by a distance which may vary from several tenths of millimeters to several millimeters for example from 2 to 3 tenths of a millimeter to 2 to 3 millimeters.

The hammer 14 is advantageously inserted between the two rollers 21 mounted for rotation on a member 22 about axis 23. This member 22 is itself mounted for sliding on the support 12, a member 17 for adjustment for example a screw allowing the member 22 to approach or be separated from the volume 1 and thus bring to the level of the plane of support of the face 1c of the sheet the upper generatrices of the rollers 21. The housing 15 of the hammer may also be fixed to the axis 23 of the rollers 21 and mounted for sliding in the member 22, an adjustment member 20 serving for moving the hammer closer to or further from the volume once the rollers 21 are mounted in position. This adjustment member 20 may for example be formed by an eccentric part 23a having an axis 23, this axis being mounted freely on the member 22 and being capable of being immobilised by means of a pin 23b, or other means of fixing. Once the axis 23 and the member 22 are immobilised the positions of the hammer 14 and the rollers 21 remain fixed whatever the thickness of the volume unless it is desired to modify the distance by which the mass 16 is capable of passing the plane 1c.

Further it is advantageous to arrange in contact with the face 1b of this volume, other rollers 24 mounted for free rotation on an axis 25 and supported on the sheet by means of a jack 26 operated by gas or compressed air or by a motor member, the cylinder 26a and piston 26b of the jack being, for example, rigidly connected to the support 12 and axis 25. These rollers 24 exercise pressures on the face 1b of the sheet applying the latter to the rollers 21. The rollers 21 and 24 are preferably covered with an elastomer to avoid marking of the glass and are advantageously arranged facing one to the other so that the volume is subjected to pressures exercised on the two surfaces at points situated opposite each other.

There will now be described the functioning of the apparatus given that the sheet or the volume 1 is driven in the direction of the arrow F by means of conveyor 3 at a predetermined speed, for example about 0.5 meters per second.

When the forward end 1d of the sheet reaches position 27 behind the tool 13 this tool is brought to the face 1b of the sheet in order to merely trace on this surface a longitudinal score 28 intended to extend to the forward end 1d and the rear end 1e of the volume. There is thus defined in this volume a central part 1h which is intact and of good quality and the lateral borders 1f, 1g of lower quality which are to be removed. The tracing tool will then be lifted when the rear end 1e of the sheet passes a position 29 in front of this tracing tool.

The forward end 1d of the sheet still driven in the direction of arrow F arrives at a position 30 by the pneumatic hammer 14 and the rollers 21, 24. The rollers 24 are brought into contact with the surface 1b by means of the jack 26, the hammer being started at a frequency of striking which is related to the speed of the conveyor 3. This frequency is of the order of 50 to 70 Hertz if the conveyor advances at about 0.5 meters per second, the sheet thus being struck at intervals of less than 1 centimeter. Preliminary trials have however shown that if the mass 16 can be separated from the score line 28 by a distance not more than 1 mm, it would be advantageous to hammer the surface 1c facing the line of cut; it is therefore useful to align with precision the mass 16 of the hammer relative to the tool 13 facing the direction of the arrow F or the axis 3a of the conveyor. The tool 13 and the mass 16 thus rest in desired relative positions one of the other even when the line of cut has been displaced, given that the tool and the hammer are fixed to support 12. After having hammered the volume from its forward end 1d to its rear end 1e, the hammer is stopped when this end occupies the position 31 in front of the hammer and the rollers. It then only remains to break the glass along the line of score 28 in such a manner as to detach the lateral borders 1f, 1g from the central part 1h.

For this purpose it would be possible to operate manually on the borders of the volume with flexing force parallel to the longitudinal axis 1a of the sheet or the axis 3a of the conveyor but then the apparatus ceases to be entirely automatic. It would also be possible to feed the pneumatic hammer under pressure of air or gas so strong that the volume will be energetically hammered so as to create in the glass a crack adjacent the line of score so that the lateral borders are joined only weakly to the central part and, the lateral borders having a significant weight, this weight would exercise a bending effect sufficient to break the glass along the lines of score. The central part 1h of the sheet supported by the conveyor 3 is then transported by the conveyor towards a location of use. However in this case the glass is frequently marked, the glass being hammered too strongly; in fact the glass is not broken correctly, that is to say with rectilinear cuts which are perpendicular to the sheet surface, except in certain conditions of re-heating, thickness of the sheet and width of the border.

In the process of the invention, it is preferable to associate the two processes and to use a pair of breaking heads 32a, 32b (FIGS. 1 and 4) which may be identical and relate respectively to the two borders of the volume. Both these heads of which only one, 32a, will be described comprise two rollers 33, 34 mounted for rotation on the support 12 about axes 35, 36 transverse to axis 3a of the conveyor 3 facing the surface 1d of the lateral border 1f and the surface 1c of the central part 1h of the volume. One of these rollers for example 34 is controlled by means of a motor member 37 for example a jack operating by means of air or compressed gas.

When the rear end 1e of the volume leaves a position behind the rollers 33, 34, the jack 37 pushes the roller 34 onto the face 1c of the central part 1h separating a portion of the latter from the conveyor 3 and pressing the lateral border 1f if against the roller 33. This roller causes at the rear end 1e of the edge a bending force which breaks the volume 1e along the line of score. After the rear end 1e of this sheet has been separated from the rollers 33, 34 these rollers reoccupy their original positions, the sheet continuing being driven in the direction of the arrow F by the conveyor 3.

It should be noted that the roller 33 has two end surfaces 33a, 33b and a lateral surface 33c of revolution about the axis 35. Only one point of this lateral surface — this point may also be situated on a base — comes into contact with the lateral border 1f of the volume.

For this purpose the axis 35 is orientable in a plane perpendicular to the axis 3a of the conveyor and to the axis 1a of the volume. As shown in the drawing, the roller 33 may be mounted on a cradle 40 pivoting on the support 12 about an axis 41, the cradle 40 and the axis 35 being oriented by means of the screw 42. This roller, cylindrical in the embodiment shown in FIG. 5 may alternatively, in another embodiment shown in FIG. 6 comprise two truncated cones 33d, 33e having two large bases which are connected 33f, 33g and two small bases 33a, 33b. It will be noted that only one of the trunks of the cone, for example 33d as shown in the drawing, cooperates with the volume, the other trunk 33e serving as a replacement for the conical trunk 33d when the latter is worn out.

In an embodiment shown in FIG. 5, the roller 34 is formed by two trunks of cone 34a, 34b, mounted for rotation about the axis 36, and respectively situated facing the lateral border 1f and the central part 1h of the volume. These trunks of cones have small bases 34c, 34d, identical large bases 34e, 34f, lateral surfaces 34g, 34h and apex angles 34j, 34k of which the half sum is about 5°. It will be noted that an observer will see the tool 13 for scoring between the large bases 34e, 34f of the trunks of cone, when the observer sees in the direction of the arrow F (but in the inverse direction) and the axis 3a of the conveyor.

The trunk of cone 34a is intended, under the action of jack 37, to come into contact with the centre 1h of the volume and to raise the latter, the cone trunk 34b having as its purpose allowance of a bending to a limited value of the lateral border 1f under the action of the roller 33 which presses the lateral edge at a point. For this reason the roller 33 is advantageously of metal, the roller 34 being, on the other hand, advantageously covered with an elastomer in order to avoid marking of the glass. These rollers, as they are each formed of two trunks of cone, are commonly described as "diabolos".

In the embodiment of FIG. 6 the trunk 34a is replaced by a cylinder having the same reference numeral of identical base 34e and mounted for revolution about the axis 36, the trunk 34b then having an angle 34k at the apex of about 10°. It will be noted however, that the embodiment shown in FIG. 5 is especially advantageous given that the conical trunks 34a, 34b may be made interchangeable if their apex angle has the same value of approximately 5°. But in any case when the roller 34 is formed by two trunks of cone (FIG. 5) or by a trunk of cone and cylinder (FIG. 6), the elements 34a, 34b of the roller are intended to enter into contact with the glass along the generatrices of their lateral surfaces 34g, 34h.

For this purpose the axis 36 is mounted in the same manner as axis 35 on a cradle 43 which is orientable, for example by means of screw 44 in a plane perpendicular to the axis 3a of the conveyor and the axis 1a of the volume. As shown in the drawing, the roller 34 may be mounted pivotally on a support 12 by means of an axis 45, the cradle 43 and the axis 36 being oriented by means of the screw 44.

To use the breaking head described above, first of all the cradles 40 and 43 are adjusted by means of screws 41 and 44 in such a manner that a point on the lateral surface 33c of the roller 33 and a generatrix of the elements 34a, 34b of the roller 34 are capable of entering into contact with the glass. It will be noted that the bases 34e, 34f of elements 34a, 34b of the roller 34 act in respect to both sides of the line 28 of score given that the above-mentioned observer sees, when he looks in the direction of the arrow F, (but in the reverse sense) and the axis 3a of the conveyor, the tool 13 for tracing between bases 34e, 34f.

On activating the jack 37, when the rear end 1e of the volume leaves position 38 (FIG. 1), the element 34b of the roller 34 starts by lifting the central part 1h of the volume, in the neighbourhood of the line of score the surface 1c of this part then coming into a plane 1j situated above the plane 1c, then touching the lateral surface 34h of the element 34b along a generatrix. When the movement of lifting continues under the action of jack 37, the lateral border 1f of the volume has touched the roller 33 at a point on the lateral surface 33c of the latter. The roller 33 then exerts a pressure J which tends to rebate and to apply the lateral border of the volume on a plane 1k touching the lateral surface 34g of the element 34b of the roller 34 along a generatrix.

There results from the preceding that the planes 1k, 1j, that is to say the lateral border 1f of the volume and the central part of this volume which is applied on the element 34a by the weight of the glass, occupy angular positions determined with respect to a plane 1c formed by the top of the conveyor 3 the planes 1g and 1k defining between themselves an angle of about 5°. Further the lateral border of the volume is subjected to reactions K exercised by the base 34f and the lateral surface 34h of the element 34b of the roller 34. The glass is in consequence subjected straight on the line of cut to a very small cutting force. There is thus avoided, when the glass is broken, rubbing of the lateral border of the volume on the central part of the latter.

With the apparatus described above there is obtained a correct rupture of the glass along the line of score whatever the conditions of re-heating, thickness of the volume and width of the lateral edge. In particular the thickness of the volume may greatly exceed 8 mm and reach 20 mm. The hammers used during preliminary trials comprise a mobile mass having a weight of approximately 80 to 120 grams and a path of several tenths of a millimeter to several millimeters and have an end emerging from the housing which is plane. There have also been tried with success identical mobile masses but of which the end emerging from the housing and intended to come into contact with the sheet of glass is slightly curved. The hammer may be fed with compressed air at a pressure of about 2.5 kilograms per square centimeter when the thickness of the glass sheet was 8 millimeters and under a pressure of about 3.3 kg per square centimeter, when the thickness was 15 mm.

The cuts or the edges of the glass broken using the apparatus described above comprise small projections which are regularly spaced on the hammered face 1c joining, along small furrows, the line of cut traced on the face 1b. These small projections and furrows do not however prevent the edges being rectilinear or perpendicular to the faces of the sheet.

In order to automatically remove the lateral borders from the volume the latter is again transported in the sense of arrow F to bring the volume onto part 3d of the conveyor 3, a part described as the "edge removing" part. Each of the edges 46a, 46b is formed by a chassis 47 mounted to pivot on the side wall 3b of the conveyor, for example about an axis 48 on which are mounted for free rotation the rollers 49. A control member 50, for example a jack, allows the edges to tilt (arrow L).

When the volume arrives at this part of the conveyor the central part 1h of the volume overlapping the conveyor 3 in order to allow the roller 49 to rotate and thus drive the lateral borders 1f, 1g in the direction of the arrow F, the edges 46a, 46b are pivoted by means of the jacks 50. The lateral borders of the volume then fall into receptacles (not shown) where they are recovered as cullet.

In one embodiment of the invention, the glass sheet is formed by the ribbon 100 which is edge-cut before being cut into volumes 1 by means of apparatus analogous to that of FIG. 1 and shown in FIG. 8.

In this figure there is seen the conveyor 3, an edge-cutting post 11, a support 12, a cutting tool 13, the hammer 14 and the opening heads 32a, 32b, the reference station being omitted. The ribbon 100 advances in the direction of arrow F and is successively scored with cutting lines 28 which are longitudinal by means of tracing tools 13, then hammered by means of hammers 14, the lateral borders 1f, 1g of the ribbon being detached by means of breaking heads 32a, 32b. These breaking heads are identical or very analogous to those shown in FIGS. 4, 5 and 6 of the drawing. However the half sum of the angles 34j, 34k at the summit of the trunks of cone 34a, 34b (FIG. 5) is about 1°, the apex angle of the trunk of cone 34b being about 2° in the case of the embodiment of FIG. 6.

As functioning of this apparatus is analogous to that of the apparatus shown in FIG. 1, the mode of operation of the tracing tool and hammer will not be described. It will however be noted that the breaking heads 32a, 32b are "constantly closed" as the rollers 33 and 34 are constantly in contact with the glass. The central part 1h of the ribbon in the neighbourhood of the lines of cut 28 is progressively raised as the glass approaches the breaking head, the glass coming into contact with the rollers 33, 34 as above. The functioning of the breaking heads remains in consequence practically identical, the apex angles of the trunks of the cones simply being reduced in order to prevent the lateral borders of the ribbon becoming detached under the hammer from the central part of the ribbon. It is moreover possible in the apparatus of FIG. 1 to leave the breaking heads closed, the jack 37 pushing the roller 34 onto the glass before the rear end 1e of the volume leaves the position behind the rollers 33, 34. The volume is however broken in a manner which is less satisfactory than when the breaking heads act only on the rear end of the volume. From time to time chips may become detached from the central part 1h of the volume. It is possible to make the breaking heads act on the forward end of the volume instead of the rear end of this volume with results which are also satisfactory, the only disadvantage being the requirement to lengthen the support 12.

After the glass ribbon has passed through the breaking heads it remains to separate the lateral borders from the ribbon, which, without this would become dangerous for the operators.

For this purpose the glass ribbon advancing still in the direction of arrow F arrives at a station 51 formed by two identical assemblies 51a, 51b connected to the supports 12 of assemblies 11a, 11b. Each of the assemblies 51a, 51b is formed of a bridge 52a, 52b for scoring and a breaking device 53a, 53b. These bridges are of known type and it is not necessary to describe them for this reason. It will suffice to repeat with regard to FIG. 9 that a breaking device may comprise a lower roller associated with two upper rollers 54 respectively intended to come into contact with the faces 1c, 1d of the lateral borders of the ribbon. In the construction shown in the drawing, the rollers 54 are fixed to a lever 55 mounted pivotally on the support 12 about an axis 56 which is adjustable in position by appropriate means, for example a screw 57, the lower roller being formed by a roller 4 of the conveyor 3.

The station described above allows scoring on the lateral borders of the ribbon at predetermined intervals of length or time along transverse lines of cut advantageously perpendicular to the axis 3a of the conveyor and to breaking of the lateral borders between the rollers 4 and 54 of FIG. 9 by subjecting these borders to a bending about a transverse axis advantageously perpendicular to the axis 3a. These lateral borders fall, once broken, into receptacles (not shown) where they are recovered as cullet. The glass ribbon then arrives under a tracing bridge 60 where it receives a transverse cutting trace (not shown) advantageously perpendicular to the axis 3a of the conveyor, then under a breaking device 61 where the glass ribbon is divided into volumes by subjecting this ribbon to a flexing about a transverse axis advantageously perpendicular to the axis 3a. It will be noted that when the bridge 60 or the device 61 are released a signal may be emitted to the bridges 52a, 52b serving to start them simultaneously.

In another embodiment of the invention, a glass ribbon which comprises the lateral borders 1f, 1g is traced under the bridge 60, then broken in the device 61, the station 51 then being omitted. The volume thus obtained, accompanied by its lateral edges, is then brought onto a conveyor having edges analogous to the part 3d of conveyor 3 of FIG. 1, the axes 48 about which the edges are mounted for pivoting being arranged below the conveyor in order to avoid damage to the central part 1h of the sheet when the edges are tilted (arrow L). The volume, free from its borders on the conveyor, is then directed towards the location of utilization. It results from the preceding that the present embodiment of the invention is simpler than that previously described, given that the station 51 may be omitted.

Further, in another embodiment, it should be noted (FIG. 10) that any change of separation between the longitudinal lines of cut 28 requires treating of a volume by hand, this volume having lines of cut which do not extend from the front end to the rear end of the volume. This disadvantage is however not important if changes in separation are rare, the volume then being simply rejected and used as cullet.

Further, it is impossible to bring in all circumstances the axis 1a of the ribbon into coincidence with the axis 3a of the conveyor, even if it would be possible to do this for a volume by means of an aligning station 5 (FIGS. 1 and 2). It results that operators are frequently obliged to displace the assemblies 11a, 11b especially in order to enlarge or reduce the lateral margins which, apart from other faults, may have marks 58 from rollers derived from drawing when the ribbon is manufactured by the float glass process.

Finally, in FIG. 11 there is represented a particular way of mounting advantageously the cutting tool 13 formed here by a cutting wheel. This cutting wheel is protected against shock by means of a roller 62 of elastomer and arranged upstream with respect to the direction F of movement of the glass. As shown in the drawing, there is mounted pivotally on the support 12 an arm 63 and a cylinder 64a of a jack 64, the piston 64b of this jack and the arm 63 being articulated on a carriage 65 on which are mounted for rotation the wheel 13 and the roller 62. This wheel 62 between the first in contact with the front end 1d of the volume and the slice of this volume. It will be understood that the bridges 52a, 52b of station 51 are advantageously equipped with devices analogous to those of FIG. 11.

I claim:

1. An automatic method of recovering glass of good quality from a longitudinal glass ribbon having a central part of good quality and edge portions of inferior quality which comprises the steps of:

scoring merely a line of cut on a first surface of the ribbon between the central part and the edge portion, hammering a second surface of the glass along a path opposite the score line to initiate breakage, the glass being subject to pressure exerted on both surfaces at points facing each other and at the point where the glass is hammered, bending the glass by lifting the central part of the glass adjacent the score line and rebating the edge portions to bring the surfaces of the central portion and said edge portion to predetermined angular positions to complete breakage, dividing the ribbon to give a sheet of the required length, and removing the edge portion from the central portion.

2. A process according to claim 1, in which the hammering is carried out at a distance from the score line of not more than 1 mm.

3. A process according to claim 1, in which the sheet is struck during hammering at intervals of less than 1 cm.

4. A process according to claim 1, in which the bending is exercised by applying pressure at a single point of each of the edge portions.

5. A process according to claim 1, in which the edge portions are subjected to continuous bending and form with the central part of the sheet adjacent the lines of score an angle less than 1°, the glass sheet comprising a continuous ribbon.

6. An automatic method of recovering glass of good quality from a longitudinal glass ribbon having a central part of good quality and edge portions of inferior quality which comprises the steps of:

dividing the ribbon to gave a sheet of the required length, scoring merely a line of cut on a first surface of the sheet between the central portion and the edge portion, hammering a second surface of the glass along a path opposite the score line to initiate breakage, the glass being subjected to pressure on both surfaces facing each other and at the point where the glass is hammered, bending the glass by lifting the central part of the glass adjacent the score line and rebating the edge portion to bring the surfaces of the central portion and said edge portion to predetermined angular positions to complete breakage, and removing the edge portion from the central portion.

7. A process according to claim 6, in which the glass is broken by exerting, after hammering along the whole length of the sheet, bending at a single and of the glass at a predetermined moment, the other end of the sheet being left free.

8. A process according to claim 6, in which the edge portions and the central part of the sheet adjacent the lines of score form an angle of not more than 5°, the glass sheet comprising a volume of predetermined length.

* * * * *